United States Patent [19]

Yumde et al.

[11] 4,210,927

[45] Jul. 1, 1980

[54] METHOD FOR TRANSMITTING A COLOR VIDEO SIGNAL ON A NARROW-BAND TRANSMISSION LINE

[75] Inventors: Yasufumi Yumde; Takashi Furuhata, both of Yokohama, Japan

[73] Assignee: Hitachi, Ltd., Japan

[21] Appl. No.: 903,609

[22] Filed: May 8, 1978

[30] Foreign Application Priority Data

May 11, 1977 [JP] Japan .................................. 52-53090

[51] Int. Cl.² ............................................. H04N 9/32
[52] U.S. Cl. ..................................... 358/12; 358/133
[58] Field of Search ............................. 358/12, 133, 4

[56] References Cited

U.S. PATENT DOCUMENTS 4,084,181  4/1978  Mita et al. .............................. 358/12

OTHER PUBLICATIONS

IEEE Tokyo Section Denshi Tokyo, vol. 14, p. 16, 1975, Yasufumi Yumide et al., "Cassette Picture Recording System".

1976 Conference on Japan Television Society, 15-5, "PDM System Stationary Picture Transmission", pp. 271-272.

Primary Examiner—Richard Murray
Attorney, Agent, or Firm—Craig & Antonelli

[57] ABSTRACT

A method for transmitting a color video signal on a narrow-band transmission line such as a telephone line or an audio tape recorder is disclosed. The carrier frequency is so reduced that no clock signal of high frequency is used. The carrier chrominance signal and the brightness or luminance signal are transmitted separately in time-division multiplication thereby to eliminate color distortion. The write clock signal frequency for the carrier chrominance signal is rendered inversely proportional to the product of a given number determined by the number of samples required for faithful transmission of the carrier chrominance signal and a multiple enabling the carrier frequency to be minimized. The read clock signal frequency for the carrier chrominance signal is reduced to one over an integer of the luminance signal, so that the carrier chrominance signal is read at intervals of the integer in order of storage in a memory. At the time of writing the color chrominance signal in the memory, the write clock frequency therefor is rendered equal to the write clock frequency for the luminance signal. Thus the capacity of the memory for the carrier chrominance signal is one over an integer of that for the luminance signal.

14 Claims, 2 Drawing Figures

F I G. 2
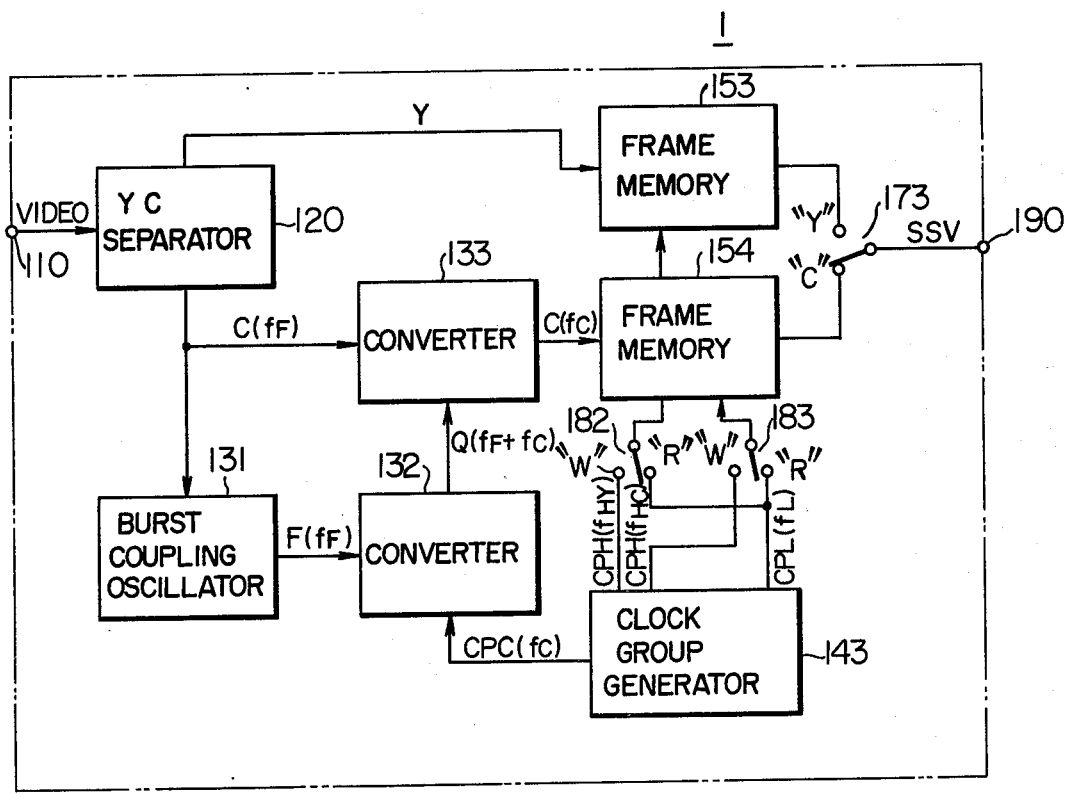

METHOD FOR TRANSMITTING A COLOR VIDEO SIGNAL ON A NARROW-BAND TRANSMISSION LINE

LIST OF THE PRIOR ART REFERENCES (37 CFR 1.56 (a))

1. —IEEE Tokyo Section Denshi Tokyo Vol. 14, pp 16, 1975, Yasufumi Yumide et al "CASSETTE PICTURE RECORDING SYSTEM"
2. —1976 Conference on Japan Television Society, 15-5 "PDM system stationary picture transmission" pp 271-272.

BACKGROUND OF THE INVENTION

This invention relates to a method for transmitting a color video signal over a telephone line, an audio tape recorder or other narrow-band transmission lines.

In converting or reversely converting what is called the broad-band video signal for the standard broadcasting system of the NTSC Color System into a narrow-band signal, a generally well known method is by storing the video signal temporarily in a memory and changing the clock pulse frequency applied when reading the video signal, thereby converting the occupied band of the signal. In order to transmit the phase of the carrier chrominance signal faithfully in the NTSC color system, the clock frequency of the memory, i.e., the sampling frequency, is required to be approximately three times the carrier frequency thereof. In the case of an NTSC color system, the carrier of the carrier chrominance signal (hereinafter referred to as C signal) is 3.58 MHz, and therefore the clock frequency is 10.74 MHz or three times the carrier frequency. On the other hand, the luminance signal (hereinafter referred to as the Y signal) has a band of 4.5 MHz. For reducing this signal into picture elements, the clock frequency of about 9 MHz or a double frequency is sufficient in view of the limit of visibility of an ordinary color monitor.

The problems posed here are that a high-speed memory is required, that a memory capacity more than required must be provided for the Y signal band, and that in order to reduce such distortion as differential phase or differential gain, superior transmission characteristics are required of the narrow-band transmission line or, if the transmission characteristics are inferior, the transmission time is required to be lengthened.

BRIEF DESCRIPTION OF THE DRAWINGS

FIG. 2 is a diagram showing a modification of the transmitter section of the color video signal transfer system according to the present invention.

SUMMARY OF THE INVENTION

Figure 1:
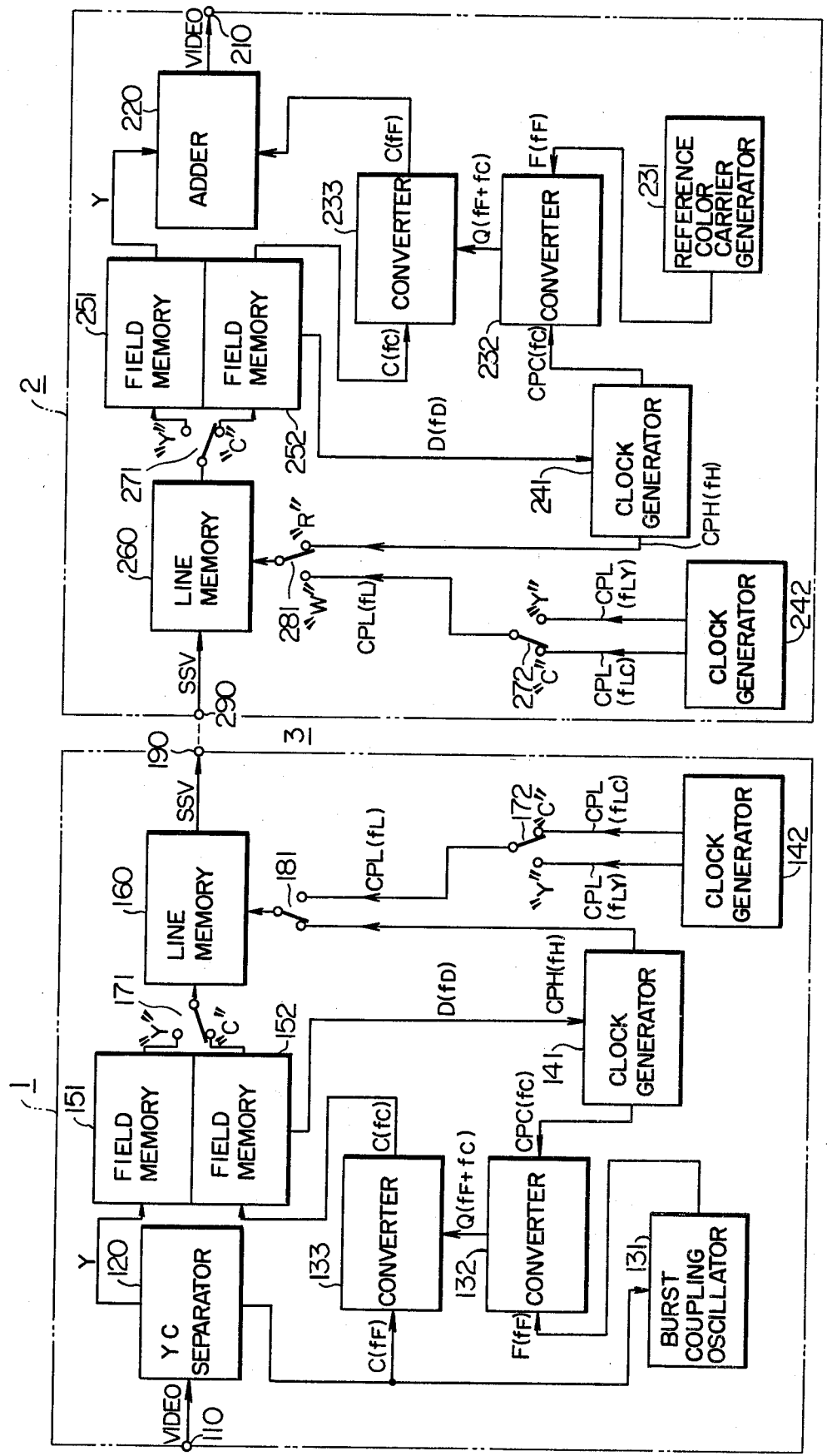
FIG. 1 is a diagram showing a general configuration of the color video signal transmission system according to an embodiment of the present invention.

An object of the present invention is to solve the above-mentioned problems and to provide a color video signal transmission system wherein the memory speed and memory capacity required for the band conversion of the color video signal are reduced, so that the color distortion in the transmission line is reduced on the one hand and the transmission time is shortened on the other hand.

According to the present invention, there is provided a color video signal transfer system in which the carrier frequency of the C signal is reduced in the first place, thus eliminating the necessity of using the clock frequency higher than is required. Another feature of the invention is that in view of the fact that the simultaneous multiplication of the C and Y signals reduces the fidelity of the transmission, the Y and C signals are separately transmitted in time-division multiplication, thus eliminating the color distortion including the differential phase and differential gain. A third feature of the invention resides in the fact that the carrier frequency $f_C$ of the C signal is selected at $1/mn$ of the write clock frequency $f_H$ for the writing in the memory, where m shows a given number depending on the number of samples required for faithful transmission of the magnitude and phase of the signal, and n a multiple for minimizing the carrier to the lowest 500 KHz for the NTSC system in which case the C signal band may be included in the range of ±500 KHz. Assuming that $f_H$ is 9 MHz, $n=6$ where $m=3$ for example. The time-division transmission of the Y and C signals would lengthen the transmission time. In order to shorten it, a fourth feature of the present invention lies in that the read clock frequency $f_{LC}$ for the C signal is rendered n times as high as the read clock frequency $f_{LY}$ for Y signal. By doing so, the required transmission time for the C signal is reduced to $1/n$ of that for the Y signal. This effect is realized by the fifth and sixth features mentioned below. The fifth feature of the invention is that the C signal is read at intervals of n in order of storage thereof in the memory, and the sixth feature is that in writing the C signal in the memory, the write clock frequency $f_{HC}$ is rendered $1/n$ of the write clock frequency $f_{HY}$ for the Y signal, i.e., the frequency $f_H$. According to this method, the capacity of the memory taking charge of the C signal is reduced to $1/n$ of that for the Y signal.

DESCRIPTION OF THE PREFERRED EMBODIMENTS

A general constitution of the color video signal transfer system according to an embodiment of the present invention is shown in FIG. 1.

Reference numeral 1 shows a transmitter section, numeral 2 a receiver section, and numeral 3 a narrow-band transfer line including a telephone line or an audio tape recorder.

In the description that follows, the color signal for the NTSC standard broadcasting system will be taken up as a broad-band video signal. The present invention, however, may be applied with equal effect without departing from the spirit thereof to other equivalent systems or PAL system or the case involving three chrominance signals of R, G and B, with mere difference existing in the intermediate processes.

First, the color video signal for NTSC system (hereinafter referred to as NTSC signal) is applied to the input terminal 110 of the transmitter section 1, and divided into Y and C signals by the YC separator 120. The C signal comprises two components R-Y and B-Y by which the NTSC subcarrier $f_F (=3.58$ MHz$)$ is quadrature modulated, and this signal is expressed as $C(f_F)$.

The signal $C(f_F)$ drives the burst coupling oscillator 131 and generates a continuous carrier $F(f_F)$ in synchronism with the phase of the burst signal contained in $C(f_F)$. This signal is applied to the converter 132 and added in frequency mixture to the carrier $CPC(f_C)$ from the clock generator 141, thus producing the carrier $Q(f_F + f_C)$.

The frequency $f_C$ of the carrier CPC($f_C$) is determined at 1/m·n of the frequency $f_H$ of the memory write clock frequency CPH($f_H$) as described later, wherein m is a given number and n an integer not less than 1. In the embodiments described below, explanation will be made of the case wherein m=q/p, where both p and q are integers and $f_C$ is synchronously coupled with $f_H$.

If m=q/p (where both q and p are integers), the clock generator 141 may be comprised of a PLL (Phase Lock Loop) and a counter so that all clock signals and carriers may be produced in synchronously coupled relation. The clock generator for generating the carrier in such a relation is comprised of the PLL and the counter. The carrier Q($f_F$+$f_C$) is applied to the converter 133 where it is mixed with and subtracted from the signal C($f_F$) thereby to produce the chromaticity signal C($f_C$) modulated on the carrier of frequency $f_C$. This chromaticity signal C($f_C$) is one of the features of the present invention. In the case where the input video signal comprises three chrominance signals of R, G and B, for example, the signal C($f_C$) is obtained by producing Y, R-Y and B-Y signals through a matrix, and the carrier CPC($f_C$) is quadrature modulated by R-Y and B-Y signals. The Y and C($f_C$) signals thus obtained are simultaneously stored in the two-channel field memories 151 and 152 temporarily.

In the embodiment under consideration, each field memory takes the form of a magnetic disc memory, but it may of course be replaced with equal effect by a frame memory. The magnetic disc is so constructed that its rotation synchronous with the field or frame period of the input video signal is provided by a servo control, and a disc pulse D($f_D$) indicating the rotational phase thereof is generated by a digital tachometer or like. The signal D($f_D$) drives the clock generator 141 thereby to generate the clock pulse CPH($f_H$) and the carrier CPC($f_C$). As a specific example, the basic frequency of D($f_D$) is NTSC line frequency of 15.734 KHz, while the frequency of the memory write clock CPH($f_H$) is not less than 9 MHz which is sufficiently high to reduce the Y signal to picture elements. Thus PLL coupling is effected so that $f_H$=600×$f_D$=9.44 MHz, thereby producing CPH($f_H$) from D($f_D$). Next, in order to produce a carrier CPC($f_C$) sufficient and required for transmission of the band ±500 KHz of the NTSC C signal, m=3 (or q=3 and p=1 in the above-mentioned relation) and n=6 are selected; the CPH($f_H$) is counted down to 1/18; and thus CPC($f_C$) of $f_C$=524.47 KHz is obtained. Now, the Y and C($f_C$) signals corresponding to one frame which are stored in the field memories 151 and 152 are read and switched to "Y" and "C" by the switch 171 in Y and C($f_C$) line time division or field or frame time division, and written in the next line memory 160 line by line. The line memory 160 is a clock-controlled analog memory having a memory capacity of one line. The memory 160 is supplied with the write clock CPH($f_H$) at the time of writing, and the read clock CPL($f_L$) at the time of reading. The change-over between read and write clocks is performed by the contacts "W" and "R" of the switch 181.

The read clock signal CPL($f_L$) is generated by the clock generator 142, and the frequency thereof $f_L$ is determined according to the conditions for transmitting the Y signal without distortion in the possible transmission band of the narrow-band transmission line 3.

If the frequency $f_H$ of the write clock CPH($f_H$) is 9.44 MHz as in the above-described embodiment, with the frequency $f_L$ of the read clock CPL($f_L$) being selected as $f_L$=4.72 KHz, the required band for the narrow-band transmission line 3 results 2.36 KHz, thereby making possible the transmission over an ordinary telephone channel. In this case, the scanning speed conversion ratio is 2000, and therefore the transmission time 2000 times that for the broad-band signal is required, with the result that the Y signal for one field is transmitted in 33.3 seconds.

The carrier frequency for C signal, on the other hand, is reduced to 1/mn as explained above. In view of the carrier frequency converted into the narrow band and the occupied band, the transmission of the C signal does not require as much time as that for the Y signal but may be reduced to 1/n. In other words, the frequency $f_{LC}$ of the read clock CPL($f_{LC}$) for the signal C($f_C$) is increased as high as n times the frequency $f_{LY}$ of the read clock CPL($f_{LY}$) for the Y signal. Thus the time required for transmission of C signal is 1/n of that for Y signal. In the example cited above, m=3 and n=6, so that the transmission time for one color field is 38.9 seconds (=33.3 seconds×(1+1/6)), and therefore the frequency $f_{LY}$=4.72 kHz and $f_{LC}$=28.32 KHz. The read clocks CPL($f_{LY}$) and CPL($f_{LC}$) of these frequencies are generated by the clock generator 142 and applied to the line memory 160 after being selected by the switch 172.

The above-mentioned series of operation are continued until the cooperative change-over operation of the switches 171, 172 and 181 causes all the color video signals for one frame are converted into the narrow-band video signal SSV and completely produced at the output terminal 190. The cooperative operations of these switches, though not shown in the drawings, are performed on the instructions from the system control device.

Since $f_{LC}$ is made equal to $nf_{LY}$ as mentioned above, the advantage of a shortened transmission time of the C signal is also obtained by reading the stored signals at intervals of n in order of storage of signals in the memory. In the case of a memory such as RAM of the address designation type, for example, data may be read at intervals of n addresses. For the shift out type apparatus such as the shift register, on the other hand, a group of n clock pulses can be applied. The reading of the line memory may be effected by the address designation signal produced by the clock generator 142. The reading of the line memory may also be made by the above mentioned group of the clock pulses. Further, the above-described advantages are also obtainable in the manner mentioned below.

When the signal C($f_C$) is stored in the line memory 160, the write clock frequency $f_{HC}$ is reduced to 1/n of the write clock frequency $f_{HY}$ for the Y signal. Thus data is written by the write clock CPH($f_{HC}$) of the frequency m times higher than $f_C$. In this way, an additional advantage is obtained in which the capacity of the memory for storing signal C($f_C$) is reduced to 1/n of that for Y signal. The economical effect of this advantage is greatly appreciated in the second embodiment shown in FIG. 2. Next, such an embodiment will be described below.

In FIG. 2, the input terminal 110, the YC separator 120, the burst coupling oscillator 131, the converter 132 and the converter 133 have the same functions and operate in the same way as similar components in the preceding embodiment. The embodiment under consideration is different from that shown in FIG. 1 in that the Y signal generated from the YC separator 120 is written in the clock controlled field or frame memory 153 exclusive to the Y signal by the clock CPH($f_{HY}$). In similar fashion, the signal C($f_C$) from the converter 133 is written in a similar memory 154 exclusive to the C signal by the write clock CPH($f_{HC}$). The two signals have, of course, the frequency relation of $f_{HY}=nf_{HC}$.

After completion of writing, the two memories 153 and 154 are read by the read clock CPL($f_L$) of the same frequency, alternately by line, alternately by field or alternately by frame, so that the Y and C signals in the form of the time-divided narrow-band color video signal SSV are produced at the output terminal 190 through the contacts Y and C of the switch 173. The clocks CPH($f_{HY}$), CPH($f_{HC}$) and CPL($f_L$) and carrier CPC($f_C$) are generated by the clock group generator 143. The switches 182 and 183 are change-over switches for write and read clocks.

In the frequency relation of the above-cited example, $f_{HY}=9.44$ MHz, $f_C=f_{HY}/mn=524.47$ KHz, $f_{HC}=f_{HY}/n=1.573$ MHz, and $f_L=4.72$ KHz. As to the memory capacity for the one field, the Y memory has 157.3 K cells (=9.44 MHz×1/60 seconds), and the C memory has 26.2 K cells (=1.573 MHz×1/60 seconds). Thus it is seen that the capacity of the C memory is 1/n of that of the Y memory.

Turning back to the diagram of FIG. 1 showing the first embodiment, the narrow-band color video signal SSV thus obtained in the embodiment shown in FIG. 2 is applied to the receiver section 2 through the narrow-band transmission line 3. At the receiver section 2, the signal SSV is converted into a broad-band color video signal by a structure and operation similar to those in the transmitter section 1.

This converting operation will be described briefly with reference to FIG. 1. First, the narrow-band color video signal SSV in the form of time-divided Y and C signals applied to the input terminal 290 is stored in the line memory 260 for every line. The write clock CPL is supplied from W side of the switch 281, wherein for writing the Y signal, CPL($f_{LY}$) is applied, and for writing the C signal, CPL($f_{LC}$) is supplied by operation of the switch 272. The frequencies of these clocks have the relation $f_{LC}=nf_{LY}$ like those in the transmitter section, and these clocks are generated by the clock generator 242. After the signals for one line are stored in the memory 260, the read clock CPH($f_H$) is applied to the memory 260 from the R side of the switch 281 and the data in the memory 260 is read at high speed. The signal thus read is transferred to the field memory 251 if it is Y signal, or to the field memory 252 if it is the C signal, by the selecting operation of the switch 271. These operations are repeated systematically by driving the switches in response to the instructions from a system control device not shown until all the color video signals corresponding one frame are written in the field memories 251 and 252. Written signals are read in the form of Y signal and C($f_C$) signal respectively, so that the signal C($f_C$) is mixed with and subtracted from the carrier Q($f_F+f_C$) by the converter 233, thereby producing the signal C($f_F$). The signal C($f_F$) is an NTSC chrominance signal which is the result of the quadrature modulation of the NTSC subcarrier frequency $f_F(=3.58$ MHz) by R-Y and B-Y signals. This chrominance signal is superimposed on the Y signal at the adder 220 to produce the NTSC color video signal at the output terminal 210. The clock generator 241, like that included in the transmitter section described above, generates the carrier CPC($f_C$) and the read clock CPH($f_H$) synchronously coupled with the disc pulse D($f_D$) from the field memories. These signals have the frequency relation of $f_H=m·nf_C$ as in the preceding case. The carrier CPC($f_C$) is mixed with and added to the color carrier F($f_F$) from the reference color carrier generator 231 at the converter 232 thereby to produce the carrier Q($f_F+f_C$) which is applied to the converter 233.

The foregoing is the description of the receiver section 2 of the embodiment under consideration. This receiver section 2 may be modified in a similar manner to another receiver section corresponding to the transmitter section of the second embodiment, realizing the reduction in memory capacity.

In the above-mentioned embodiments, $f_C$ is synchronously coupled with $f_H$ in the relation $m=q/p$ (both p and q are integers), whereby interference between the C signal and clocks is prevented. According to the present invention, the number m may take any given number determined by the number of samples required for faithful transmission of the magnitude and phase of the C signal. Therefore, in the case where the number m is selected in such a manner as to couple $f_C$ and $f_H$ asynchronously, the carrier CPC($f_C$) in FIG. 1 or 2 is supplied from an independent oscillator not shown.

It will be understood from the foregoing description that according to the present invention, a color video signal is trnsmitted or recorded by means of a narrow-band transmission line, or received or reproduced, with a reduced transmission time and a reduced capacity of the band-converting memories.

We claim:

1. A method for transmitting a color video signal by a color video signal transmission system over a narrow-band transmission line comprising means for storing an input color video signal in a memory, means for reading said color video signal in the form of a time-divided luminance signal Y and a carrier chrominance signal C, at a speed different from the storing speed, to transmit the luminance signal Y and the chrominance signal C in a narrow band, and a group of clock pulse generating means for driving said memory and the reading means; comprising the steps of storing said color video signal in said memory with a write clock having a frequency $f_H$ sufficiently high to store a predetermined band of the Y signal in the form of picture elements, while said C signal is rendered a multiple signal which is produced by a quadrature modulation of a carrier of a frequency 1/m·n of the write clock frequency $f_H$ (m being a given number, and n an integer not less than 1) in advance of said storing; and reading said video signal from said memory by a read clock signal of a frequency $f_L$ sufficiently low to transmit said Y signal in a band of the transmission line which is narrower than the band of the input color video signal.

2. A method of transmitting a color video signal according to claim 1, in which the C signal is read from said memory by a read clock of frequency $f_{LC}$ which is n times higher than a clock frequency $f_{LY}$ for reading the Y signal (n being an integer not less than 1 and corresponding to n in claim 1).

3. A method of transmitting a color video signal according to claim 1, in which the C signal is read from said memory in order of storage in said memory at intervals of n (n being an integer not less than 1 and corresponding to n in claim 1).

4. A method of transmitting a color video signal according to claim 1, in which the C signal is written in said memory by a write clock of a frequency $f_{HC}$ as low as 1/n of a clock frequency $f_{HY}$ for writing the Y signal in said memory (n being an integer not less than 1 and corresponding to n in claim 1).

5. A method for transmitting a color video signal, comprising the steps of:
   YC separation of an input color video signal into a luminance signal Y and a signal C(fF) which is obtained by quadrature modulation of first and second chromatic difference signals R-Y and B-Y with a subcarrier;
   generating a chrominance signal C(fC) by modulating said signal C(fF) with a new carrier which is obtained from a carrier F(fF) synchronized with a burst signal in said signal C(fF) and a carrier CPC(fC) generated from a first clock generating means;
   memorizing said luminance signal Y and said chrominance signal C(fC) in a first memory;
   writing in a time division manner said luminance signal Y and said chrominance signal C(fC) memorized in said first memory, in a second memory by a write clock CPH(fH) having a frequency sufficiently high to store a required band of the Y signal in the form of picture elements, said write clock CPH(fH) being generated from said first clock generating means on the basis of a control pulse generated from said first memory; and
   reading, in a time division manner from said second memory onto a transmission line, the luminance signal Y by a clock signal CPL(fLY) generated from a second clock generating means having a frequency sufficiently low to transmit said Y signal in a band of the transmission line, without causing distortion, and the chrominance signal C(fC) by a clock signal CPL(fLC) generated from said second clock means having a frequency of n (n being an integer not less than 1) times the frequency of said clock signal CPL(fLY).

6. A method of transmitting a color video signal according to claim 5, in which the C(fC) signal is read from said second memory in order of storage in said second memory at intervals of n (n being an integer not less than 1 and corresponding to n in claim 5).

7. A method of transmitting a color video signal according to claim 5, in which the C(fC) signal is written in said second memory by a write clock of the frequency $f_{HC}$ as low as 1/n of a clock frequency $f_{HY}$ for writing the Y signal in said second memory (n being an integer not less than 1 and corresponding to n in claim 5).

8. A method according to claim 5, wherein said color video signal is of an NTSC system.

9. A method according to claim 5, wherein the frequency of the carrier CPC(fC) of said first clock generating means is determined to be 1/m·n (m being a given number, and n being an integer not less than 1) of the write clock CPH(fH), and the frequency of the carrier CPC(fC) is coupled in synchronism to the frequency of the clock CPH(fH).

10. A method according to claim 5, wherein said first memory includes two channel field memories.

11. A method according to claim 5, wherein said second memory has a memory capacity of one line.

12. A method according to claim 5, wherein the first memory is a magnetic disc, and the control pulse is a disc pulse $D(F_D)$ indicating the rotational phase of the magnetic disc.

13. A method for transmitting a color video signal, comprising the steps of:
   YC separation of an input color video signal into a luminance signal Y and a signal C(fF) which is obtained by quadrature modulation of first and second chromatic difference signals R-Y and B-Y with a subcarrier fF;
   generating a chrominance signal C(fC) by modulating said signal C(fF) with a new carrier which is obtained from a carrier F(fF) synchronized with a burst signal in said signal C(fF) and a carrier CPC(fC) generated from a clock generating means;
   writing said luminance signal Y and said chrominance signal C(fC) in first and second memories, respectively, by corresponding write clocks CPH(fHY) and CPH(fHC) which are generated from said clock generating means; and
   reading, in a time division manner from said first and said second memories onto a transmission line, the luminance signal and the chrominance signal by a read clock CPL(fL) generated from said clock generating means.

14. A method according to claim 5 or 13, wherein the band of the transmission line is narrower than the band of the input color video signal.

* * * * *